United States Patent
Günther et al.

(10) Patent No.: US 6,284,716 B1
(45) Date of Patent: *Sep. 4, 2001

(54) COPOLYMERS AND THEIR REACTION PRODUCTS WITH AMINES AS FUEL AND LUBRICANT ADDITIVES

(75) Inventors: Wolfgang Günther, Mettenheim; Knut Oppenländer, Ludwigshafen; Walter Denzinger, Speyer; Heinrich Hartmann, Limburgerhof; Helmut Mach; Harald Schwahn, both of Heidelberg; Hans Peter Rath, Grünstadt, all of (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/605,073

(22) PCT Filed: Sep. 6, 1994

(86) PCT No.: PCT/EP94/02963

§ 371 Date: Mar. 12, 1996

§ 102(e) Date: Mar. 12, 1996

(87) PCT Pub. No.: WO95/07944

PCT Pub. Date: Mar. 23, 1995

(30) Foreign Application Priority Data

Sep. 13, 1993 (DE) ................................... 43 30 971

(51) Int. Cl.$^7$ ................................................ C10M 129/63
(52) U.S. Cl. ........................... 508/235; 508/242; 508/454
(58) Field of Search .................... 44/386, 391; 508/235, 508/242, 452, 454

(56) References Cited

U.S. PATENT DOCUMENTS

| | | | |
|---|---|---|---|
| 3,755,169 | * | 8/1973 | Adams et al. . |
| 4,184,993 | * | 1/1980 | Signh et al. . |
| 4,240,916 | * | 12/1980 | Rossi . |
| 4,503,182 | * | 3/1985 | Durand et al. ........................ 524/474 |
| 4,575,382 | * | 3/1986 | Sweeney et al. ....................... 44/386 |
| 4,780,111 | * | 10/1988 | Dorer et al. ............................ 44/386 |
| 5,034,018 | * | 7/1991 | Gutierrez et al. ...................... 44/386 |
| 5,238,466 | * | 8/1993 | Gutierrez et al. ...................... 44/331 |

FOREIGN PATENT DOCUMENTS

| | | |
|---|---|---|
| 27 02 604 C2 | 1/1977 | (DE) . |
| WO 90/03359 | 4/1990 | (DE) . |
| 0009170 | * 2/1980 | (EP) . |
| 00099185 | * 2/1980 | (EP) . |
| 2028522 | * 9/1970 | (FR) . |
| 2065676 | * 1/1981 | (GB) . |

OTHER PUBLICATIONS

Abstract, Showa JP 59068393 AZ 84-04-18.*

* cited by examiner

Primary Examiner—Margaret Medley
(74) Attorney, Agent, or Firm—Oblon, Spivak, McClelland, Maier & Neustadt, P.C.

(57) ABSTRACT

Copolymers I carrying functional groups and comprising
  a) 20–60 mol % of at least one monoethylenically unsaturated $C_4$–$C_6$-dicarboxylic acid or an anhydride thereof,
  b) 10–70 mol % of at least one oligomer of propene or of a branched 1-olefin of 4 to 10 carbon atoms, having an average molecular weight $M_w$ of from 300 to 5000, and
  c) 1–50 mol % of at least one monoethylenically unsaturated compound which is copolymerizable with the monomers a) and b),
a process for their preparation, oil-soluble reaction products obtainable therefrom by reaction with an amine and the use of said reaction products as additives for lubricants and fuels.

7 Claims, No Drawings

COPOLYMERS AND THEIR REACTION PRODUCTS WITH AMINES AS FUEL AND LUBRICANT ADDITIVES

This application is a 371 of PCT/EP94/02963 filed on Sep. 6, 1994.

The present invention relates to novel copolymers I carrying functional groups and comprising
- a) 20–60 mol % of at least one monoethylenically unsaturated $C_4$–$C_6$-dicarboxylic acid or an anhydride thereof,
- b) 10–70 mol % of at least one oligomer of propene or of a branched 1-olefin of 4 to 10 carbon atoms, having an average molecular weight $M_w$, of from 300 to 5000, and
- c) 1–50 mol % of at least one monoethylenically unsaturated compound which is copolymerizable with the monomers a) and b), and furthermore a process for the preparation of these compounds I. The present invention also relates to oil-soluble reaction products II obtainable from the copolymers I by reaction with an amine, a process for the preparation of said reaction products, the use of the compounds II and fuels and lubricants which contain these compounds.

WO-A 90/03359 describes polymers which are used as additives in lubricating oils and have dispersant properties for sludge particles and solid particles present therein. Moreover, the polymers have viscosity index-improving properties, ie. they ensure that the viscosity of a lubricating oil which contains this compound decreases to a substantially smaller extent than that of oils without such an additive when the temperature is increased.

These polymers are composed of two monomer groups, ie. on the one hand of maleic acid or fumaric acid or derivatives of these compounds and on the other hand of an olefin whose molecular weight is sufficiently large for the polymer prepared from these monomers to be oil-soluble. The olefin must carry at least 20% of alkylvinylidene groups.

The polymers disclosed in the publication have properties which are not satisfactory for all applications; in particular, the viscosity-temperature behavior of lubricating oils which contain these polymers as additives is unsatisfactory.

Furthermore, the dispersing effect of this class of compounds is not satisfactory for all industrial applications.

It is an object of the present invention to provide additives for lubricating oils, which additives do not have these disadvantages.

We have found that this object is achieved by the copolymers defined at the outset.

We have also found a process for their preparation, reaction products II obtainable from these copolymers I by reaction with an amine, a process for the preparation of said reaction products and the use of the reaction products II. We have furthermore found lubricants and fuels which contain these compounds.

The embodiments which are particularly advantageous for the use of the copolymers I as intermediates for the preparation of lubricating oil additives are described below.

Copolymers I are composed of monomers a) to c).

Monomer a)

Suitable monomers a) are monoethylenically unsaturated dicarboxylic acids of 4 to 6 carbon atoms, such as maleic acid, fumaric acid, itaconic acid, mesaconic acid, methylenemalonic acid, citraconic acid, maleic anhydride, itaconic anhydride, citraconic anhydride and methylenemalonic anhydride and mixtures of these with one another. Maleic anhydride is preferred.

Monomer b)

Suitable monomers b) are oligomers of propene or of a branched 1-olefin of 4 to 10 carbon atoms. These oligomers are composed of at least 3 olefin molecules. Their average molecular weight $M_w$, is from 300 to 5000 g/mol. Examples of these are oligomers of propene, of isobutene and of branched isomers of pentene, hexene, octene and of decene, the copolymerizable terminal group of the oligomer being present in the form of a vinyl, vinylidene or alkylvinylidene group. oligopropenes and oligopropene mixtures of 9 to 200 carbon atoms and in particular oligoisobutenes, as obtainable, for example, according to DE-A 27 02 604, are preferred. Mixtures of the stated oligomers are also suitable. The molecular weights of the oligomers may be determined in a conventional manner by gel permeation chromatography.

Monomer c)

Suitable monomers c) are all those monomers which are copolymerizable with the monomers a) and b).

Examples of these are linear 1-olefins of 2 to 40, preferably 8 to 30, carbon atoms, such as decene, dodecene, octadecene and industrial mixtures of $C_{20}$–$C_{24}$-1-olefins and $C_{24}$–$C_{28}$-1-olefins.

Other suitable monomers c) are monoethylenically unsaturated $C_3$–$C_{10}$-monocarboxylic acids, such as acrylic acid, methacrylic acid, dimethacrylic acid, ethylacrylic acid, crotonic acid, allylacetic acid and vinylacetic acid, among which acrylic and methacrylic acid are preferred.

Vinyl and allyl alkyl ethers where the alkyl radical is of 1 to 40 carbon atoms are also suitable, and the alkyl radical may carry further substituents, such as hydroxyl, amino, dialkylamino or alkoxy. Examples are methyl vinyl ether, ethyl vinyl ether, propyl vinyl ether, isobutyl vinyl ether, 2-ethylhexyl vinyl ether, decyl vinyl ether, dodecyl vinyl ether, octadecyl vinyl ether, 2-(diethylamino)ethyl vinyl ether, 2-(di-n-butylamino)ethyl vinyl ether, and the corresponding allyl ethers.

A further group of monomers comprises $C_1$–$C_{40}$-alkyl esters, amides and $C_1$–$C_{40}$-N-alkylamides of monoethylenically unsaturated $C_3$–$C_{10}$-mono- or dicarboxylic acids, such as ethyl acrylate, butyl acrylate, 2-ethylhexyl acrylate, decyl acrylate, dodecyl acryate, loctadecyl acrylate and the esters of industrial alcohol mixtures of 14 to 28 carbon atoms, ethyl methacrylate, 2-ethylhexyl methacrylate, decyl methacrylate, octadecyl methacrylate, monobutyl maleate, dibutyl maleate, monodecyl maleate, didodecyl maleate, monooctadecyl maleate, dioctadecyl maleate, dimethylaminoethyl acrylate, diethylaminoethyl acrylate, dibutylaminoethyl methacrylate, acrylamide, methacrylamide, N-tert-butylacrylamide, N-octylacrylamide, N,N'-dibutylacrylamide, N-dodecylmethacrylamide and N-octadecylmethacrylamide.

Vinyl and allyl esters of $C_1$–$C_{30}$-monocarboxylic acids may also be copolymerized with the monomers a) and b). Specific examples of these are vinyl formate, vinyl acetate, vinyl propionate, vinyl butyrate, vinyl laurate, vinyl stearate, vinyl pivalate, allyl acetate, allyl butyrate and allyl stearate N-vinylcarboxamides of carboxylic acids of 1 to 8 carbon atoms, such as N-vinylformamide, N-vinyl-N-methylformamide, N-vinylacetamide, N-vinyl-N-methylacetamide, N-vinyl-N-ethylacetamide, N-vinyl-N-methylpropionamide and N-vinylpropionamide, are also suitable. Other examples are N-vinyl compounds of nitrogen-containing heterocycles, such as N-vinylimidazole, N-vinylmethylimidazole, N-vinylpyrrolidone and N-vinylcaprolactam.

Mixtures of the stated monomers are also suitable as building blocks for the copolymers.

Preferred among these monomers are acrylic acid, methacrylic acid, $C_{16}$-olefins, $C_{20}$–$C_{24}$-olefins, $C_{14}$–$C_{20}$-alkyl vinyl ethers and $C_{14}$–$C_{20}$-alkyl esters of monoethylenically unsaturated $C_3$–$C_6$-mono- and dicarboxylic acids.

The compolymers I contain the monomers a) to c) in amounts of from 20 to 60 mol % of monomer a), from 10 to 70 mol % of monomer b) and from 1 to 50 mol % of monomer c).

The copolymers may be prepared by all known conventional polymerization processes, for example by mass, emulsion, suspension, precipitation and solution polymerization. All stated polymerization processes are carried out in the absence of oxygen, preferably in a nitrogen stream. The conventional apparatuses, for example autoclaves and kettles, are used for all polymerization methods. Mass polymerization of the monomers of groups a) to c) is particularly preferred. It may be carried out at from 80 to 300° C., preferably at from 120 to 200° C., the lowest polymerization temperature to be chosen preferably being at least about 20° C. above the glass transition temperature of the polymer formed. The polymerization conditions are chosen according to the molecular weight which the copolymers are to have. Polymerization at high temperatures gives copolymers having low molecular weights, whereas polymers having higher molecular weights are formed at lower polymerization temperatures.

The copolymerization is preferably carried out in the presence of compounds which form free radicals. Up to 10, preferably from 0.2 to 5,% by weight, based on the monomers used in the copolymerization, of these compounds are required. Examples of suitable polymerization initiators are peroxide compounds, such as tertbutyl perpivalate, tert-butyl perneodecanoate, tert-butylperethylhexanoate, tert-butylperisobutyrate, di-tert-butyl peroxide, di-tert-amyl peroxide, diacetyl peroxydicarbonate and dicyclohexylperoxydicarbonate, or azo compounds, such as 2,2'-azobisisobutyronitrile. The initiators may be used alone or as a mixture with one another. Redox coinitiators may also be present. In the mass polymerization, they are preferably introduced into the polymerization reactor separately or in the form of a solution. The monomers a), b) and c) may be copolymerized at above 200° C. also in the absence of polymerization initiators.

In order to prepare low molecular polymers, it is often advantageous to carry out the copolymerization in the presence of regulators. Conventional regulators, such as $C_1$–$C_4$-aldehydes, formic acid and organic SH-containing compounds, such as 2-mercaptoethanol, 2-mercaptopropanol, mercaptoacetic acid, tert-butyl mercaptan, n-octyl mercaptan, n-dodecyl mercaptan and tert-dodecyl mercaptan, may be used for this purpose. The polymerization regulators are generally used in amounts of from 0.1 to 10% by weight, based on the monomers.

In order to prepare copolymers having a higher molecular weight, it is often advantageous to carry out the polymerization in the presence of chain extenders. Such chain extenders are compounds having diethylenically or polyethylenically unsaturated groups, such as divinylbenzene, pentaerythrityl triallyl ether, esters of glycols, such as glycol diacrylate, glyceryl triacrylate and polyethylene glycol diacrylates. They may be added in the polymerization in amounts of up to 5% by weight.

The copolymerization may be carried out continuously or batchwise. The molecular weights of the products are as a rule from 1000 to 50,000 g/mol.

The copolymers I may be reacted with amines of the formula $HNR^1R^2$ to give the nitrogen-containing reaction products II. $R^1$ and $R^2$ may be identical or different. Suitable amine components are ammonia, aliphatic and aromatic, primary and secondary amines of 1 to 50 carbon atoms, such as methylamine, ethylamine, propylamine, di-n-butylamine and cyclohexylamine, amines in which $R^1$ and $R^2$, together with the nitrogen atom to which they are bonded, form a common ring which may contain further heteroatoms, eg. morpholine, pyridine, piperidine, pyrrole, pyrimidine, pyrroline, pyrrolidine, pyrazine and pyridazine, amines which carry hydroxyalkylene and polyoxyalkylene radicals and in which $R^1$ and/or $R^2$ are

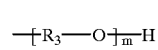

III where $R^3$ is $C_2$–$C_{10}$-alkylene and m is an integer of from 1 to 30, such as ethanolamine, 2-aminopropan-1-ol and neopentanolamine, polyoxyalkyleneamines which carry terminal amino groups and in which $R^1$ and/or $R^2$ are

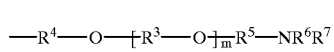

IV where $R^3$, $R^4$ and $R^5$ are each $C_2$–$C_{10}$-alkylene, m has the abovementioned meanings and $R^6$ and $R^7$ are each hydrogen, unsubstituted or hydroxyl- or amino-substituted $C_1$–$C_{10}$-alkyl or $C_6$–$C_{10}$-aryl, such as polyoxypropylenediamines and bis(3-aminopropyl) tetrahydrofurans.

Preferred amine components d) are polyamines in which $R^1$ and/or $R^2$ are a radical of the formula V

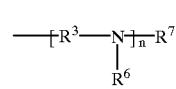

V where $R^3$, $R^6$ and $R^7$ have the abovementioned meanings and n is an integer of from 1 to 6. Suitable polyamines are ethylenediamine, propylenediamine, dimethylaminopropylamine, diethylenetriamine, dipropylenetriamine, triethylenetetramine, tripropylenetetramine, tetraethylenepentamine, ethylaminoethylamine, dimethylaminoethylamine, isopropylaminopropylamine, ethylenedipropylenetetramine, 2-diisopropylaminoethylamine, aminoethylethanolamine, ethylenepropylenetriamine, N,N,N',N'-tetra(3-aminopropyl)ethylenediamine, 2-(3-aminopropyl)cyclohexylamine, 2,5-dimethyl-2,5-hexanediamine and N,N,N',N'',N''-penta(3-aminopropyl)dipropylenetriamine.

Polyamines which contain a heterocyclic radical as a structural component, such as aminoethylpiperazine, are also preferred.

Mixtures of different amines may also be used as the amine component.

The novel reaction products II are obtained in a conventional manner by reacting copolymers I with the stated amines. The molar ratio of the components depends on the number of acid or anhydride groups in the copolymer I. This may be determined in a known manner, for example by titration with a strong base. In general, from 0.1 to 3 equivalents of acid or anhydride groups in the polymer are used per mole of amine. As a rule, the starting materials for the reaction are mixed and are heated to 30–200° C. The reaction is preferably carried out under an inert gas atmosphere and may be effected in the presence or absence of solvents. Examples of inert solvents are aliphatic and aromatic hydrocarbons, such as toluene and xylene, as well as mineral oils. The progress of the reaction can be monitored by IR spectroscopy.

The nitrogen-containing reaction products II may be used as additives for lubricants and fuels.

The lubricants are additive-containing synthetic, semisynthetic and mineral oils, preferably those which are used as engine oils. The synthetic oils comprise synthetic esters and polymers of α-olefins. The reaction products II are added to the lubricants in general as a concentrate in an inert solvent, such as a mineral oil. These concentrates may contain further conventional additives, such as rust inhibitors, antiwear agents, detergents, antioxidants and pour point improvers.

The reaction products II are added to the lubricants in amounts of from 1 to 15, preferably from 0.5 to 10, % by weight.

In fuels such as gasoline or diesel fuel, the reaction products II are used as detergents for keeping the intake system clean. Owing to their dispersant properties, they also have an advantageous effect on engine lubricants which they may enter during operation of the engine. From 20 to 5000 ppm, particularly preferably from 50 to 1000 ppm, based on the fuel, are added for this purpose.

EXAMPLES

1. Preparation of the Copolymers I

General preparation method

The monomers b) and, if required, c) (initially taken) were heated to 150° C. in a gentle stream of nitrogen in a reactor, and the monomers a) (in liquid form as a melt at about 70° C.) and, if required, c) (feed) are metered in in the course of 4 hours and a solution of di-tert-butyl peroxide, dissolved in 25 g of o-xylene, in the course of 4.5 hours at 150° C. Heating was then continued for a further hour at 150° C.

The molecular weight of the copolymers was determined with the aid of high-pressure gel permeation chromatography. The eluent used was tetrahydrofuran. Calibration was carried out using polystyrene fractions having a narrow distribution.

Details of the reactions are shown in Table 1.

TABLE 1

| | a) MA* | | b) Oligoisobutene | | | c) | | | | |
|---|---|---|---|---|---|---|---|---|---|---|
| | Amount | | | Amount | | | | | Method of | Peroxide | Molecular |
| Ex. | [g] | Mol % | [$M_w$] | [g] | Mol % | [g] | Type | Mol % | addition | [g] | weight |
| 1.1 | 98 | 50 | 1000 | 900 | 45 | 29.6 | $C_{20-24}$-1-Olefin | 5 | Initially taken | 10.3 | 3500 |
| 1.2 | 98 | 47.4 | 1000 | 900 | 42.7 | 50 | Lauryl acrylate | 9.9 | Feed | 11 | 3600 |
| 1.3 | 98 | 50 | 1000 | 900 | 45 | 22.4 | $C_{16}$-1-Olefin | 5 | Initially taken | 10.2 | 3800 |
| 1.4 | 98 | 50 | 1000 | 900 | 45 | 29.5 | Octadecyl vinyl ether | 5 | Initially taken | 10.2 | 3900 |
| 1.5 | 98 | 50 | 1000 | 900 | 45 | 11.1 | N-Vinylpyrrolidone | 5 | Feed | 10.1 | 3300 |
| 1.6 | 135 | 51.8 | 1000 | 765 | 28.8 | 100 | 2-Ethylhexylacrylate | 19.4 | Feed | 10 | 4300 |
| 1.7 | 135 | 39 | 1000 | 765 | 21.7 | 100 | Acrylic acid | 39.3 | Feed | 10 | 5800 |
| 1.8 | 135 | 56.2 | 1000 | 765 | 31.2 | 100 | Stearyl acrylate | 12.6 | Feed | 10 | 4800 |
| 1.9 | 98 | 50 | 1000 | 500 | 25 | 148 | $C_{20-24}$-1-Olefin | 25 | Initially taken | 7.5 | 4800 |
| 1.10 | 108 | 41.7 | 1000 | 612 | 23.1 | 80 | Methacrylic acid | 35.2 | Feed | 8 | 5200 |
| 1.11 | 135 | 41.1 | 1300 | 765 | 17.5 | 100 | Acrylic acid | 41.4 | Feed | 10 | 4800 |
| 1.12 | 135 | 44 | 1300 | 765 | 18.8 | 100 | Methacrylic acid | 37.2 | Feed | 10 | 5600 |
| 1.13 | 135 | 44.5 | 1200 | 765 | 10.7 | 100 | Acrylic acid | 44.8 | Feed | 10 | 9800 |
| 1.14 | 135 | 47.9 | 2300 | 765 | 11.6 | 100 | Methacrylic acid | 40.5 | Feed | 10 | 10800 |

*Maleic anhydride

2. Preparation of the Oil-Soluble Reaction Products II

General preparation method

A polymer according to Examples 1 was initially taken in xylene at 70° C., and an amine or polyamine was added and the mixture was refluxed until the expected amount of water of reaction had separated off. After the solvent had been removed, the product was obtained in the form of a pale yellow to amber-colored, viscous residue. The IR absorption bands of the products were at about 1770 and 1700 $cm^{-1}$. The reactions carried out are shown in Table 2:

TABLE 2

| Ex. | Polymer according to Example | Amine component | Molar ratio anhydride content: amine |
|---|---|---|---|
| 2.1 | 1.1 | Aminoethylpiperazine | 1,5:1 |
| 2.2 | 1.1 | Triethylenetetramine | 3:1 |
| 2.3 | 1.1 | Etherdiamine 230 (polyoxypropylenediamine, M~230 g $mol^{-1}$) | 1:1 |
| 2.4 | 1.1 | Etherdiamine 230 (polyoxypropylenediamine, M~230 g $mol^{-1}$) | 2:1 |
| 2.5 | 1.1 | Etherdiamine 400 (polyoxypropylenediamine, M~400 g $mol^{-1}$) | 1:1 |
| 2.6 | 1.1 | Etherdiamine 400 (polyoxypropylenediamine, M~400 g $mol^{-1}$) | 2:1 |
| 2.7 | 1.1 | Triethylenetetramine | 2:1 |
| 2.8 | 1.1 | Aminoethylpiperazine | 1:1 |
| 2.9 | 1.1 | Dimethylaminopropylamine | 1:1 |

TABLE 2-continued

| Ex. | Polymer according to Example | Amine component | Molar ratio anhydride content: amine |
|---|---|---|---|
| 2.10 | 1.1 | Dimethylaminopropylamine | 1.2 |
| 2.11 | 1.2 | Dimethylaminopropylamine | 1:1 |
| 2.12 | 1.2 | Dimethylaminopropylamine | 1:2 |
| 2.13 | 1.2 | Aminoethylpiperazine | 1:1 |
| 2.14 | 1.2 | Aminoethylpiperazine | 2:1 |
| 2.1S | 1.2 | Triethylenetetramine | 3:1 |
| 2 16 | 1.2 | Triethylenetetramine | 2:1 |
| 2.17 | 1.2 | Etherdiamine 230 (polyoxypropyleneediamine, M~230 g mol$^{-1}$) | 2:1 |
| 2.18 | 1.2 | Etherdiamine 230 (polyoxypropylenediamine, M~230 g mol$^{-1}$) | 1:1 |
| 2.19 | 1.2 | Aminoethyipiperazine | 1,5:1 |
| 2.20 | 1.3 | Triethylenetetramine | 2:1 |
| 2.21 | 1.3 | Triethylenetetramine | 3:1 |
| 2.22 | 1.4 | Triethylenetetramine | 2:1 |
| 2.23 | 1.4 | Triethylenetetramine | 3:1 |
| 2.24 | 1.5 | Triethyienetetramine | 1:1 |
| 2.25 | 1.5 | Triethyienetetramine | 2:1 |
| 2.26 | 1.6 | Triethyienetetramine | 2:1 |
| 2.27 | 1.6 | Triethyienetetramine | 3:1 |
| 2.28 | 1.7 | Triethyienetetramine | 2:1 |
| 2.29 | 1.7 | Aminoethyipiperazine | 1:1,5 |
| 2.30 | 1.9 | Etherdiamine 400 (polyoxypropylenediamine, M~400 g mol$^{-1}$) | 2:1 |
| 2.31 | 1.9 | Etherdiamine 400 (polyoxypropylenediamine, M~400 g mol$^{-1}$) | 1:1 |
| 2.32 | 1.9 | Triethyienetetramine | 2:1 |
| 2.33 | 1.10 | Triethyienetetramine | 2:1 |
| 2.34 | 1.10 | Etherdiamine 400 (polyoxypropylenediamine, M~400 g mol$^{-1}$) | 1:2 |
| 2.35 | 1.10 | Aminoethylpiperazine | 1:1,5 |
| 2.36 | 1.11 | Aminoethylpiperazine | 1:1,5 |
| 2.37 | 1.11 | Bis(aminopropyl)piperazine | 2:1 |
| 2.38 | 1.12 | Aminoethylpiperazine | 1:1,5 |
| 2.39 | 1.12 | Bis(aminopropyl)piperazine | 2:1 |

3. Comparison

Comparative additive VI: reaction product of the copolymer according to Example 6 of WO-A 30/03359 and triethylenetetramine TETA The stated starting materials were reacted similarly to Examples 2, in a molar ratio of 1:1.

Comparative additive V2: reaction product of the copolymer according to Example 6 of WO-A 90/03359 and TETA The stated starting materials were reacted as in Examples 2, in a molar ratio of 2:1.

4. Testing of the Viscosity-temperature Behavior

The additives were tested in a concentration of 6% by weight in a 5 W-30 engine oil:

| Additive according to Example | Viscosity 100° C. [mm$^2$s$^{-1}$] Ubbelohde | Viscosity −25° C. [mPas] CCS | Solubilty |
|---|---|---|---|
| — | 7.55 | 1900 | — |
| 2.28 | 9.71 | 2940 | clear |
| 2.33 | 9.79 | 3065 | clear |
| V1 | 9.00 | 3100 | cloudy |
| V2 | 9.19 | 3200 | cloudy |

The novel additives are superior to those of the prior art not only at high temperature, owing to their viscosity-increasing effect, but also at low temperature for the desired property, ie. very low viscosity.

5. Testing of the Dispersing Effect

To test the dispersing effect, a spot test was carried out, as described in Les Huiles pour Moteurs et la Graissage des Moteurs, A. Schilling, vol. 1, page 89 et seq., 1962. 3% strength by weight mixtures of the additives in a sooty diesel oil were prepared for this purpose. The dispersions thus obtained were developed on a filter paper in the same way as a chromatogram. The scale of values ranged from 0 to 1000: the higher the value achieved the better was the dispersing effect of the additive.

Sample preparation:

| Additive according to Example | 10 min at RT without water | 10 min at RT 1% of water | 10 min at 250° C. without water | 10 min at 250° C. with water |
|---|---|---|---|---|
| 2.28 | 635 | 632 | 650 | 682 |
| 2.33 | 636 | 634 | 679 | 675 |
| V1 | 583 | 593 | 511 | 603 |
| V2 | 570 | 686 | 605 | 558 |

RT = room temperature

In all cases, the novel additives exhibit a substantially better dispersing effect than the prior art additives.

What is claimned is:

1. A lubricant oil composition comprising:
   (1) a lubricant oil, and
   (2) from 1 to 15% by weight of an oil-soluble nitrogen-containing reaction product of:
      a copolymer obtained by free radical copolymerization of components consisting essentially of:
         (a) 20–60 mol % of at least one monoethylenically unsaturated $C_4$–$C_6$-dicarboxylic acid or an anhydride thereof,
         (b) 10–70 mol % of at least one copolymerizable oligomer composed of at least 3 olefin molecules of propene or of a branched 1-olefin of 4 to 10 carbon atoms, having an average molecular weight $M_w$ of from 300 to 5000 g/mol, and having a terminal copolymerizable group in the form of a vinyl; vinylidene or alkyl vinylidene group, and
         (c) 1–50 mol % of at least one monoethylenically unsaturated compound which is copolymerizable with the monomers a) and b) and is selected from the group consisting of a linear 1-olefin of 2 to 40 carbon atoms, a monoethylenically unsaturated monocarboxylic acid of 3 to 10 carbon atoms, an alkyl vinyl ether and an allyl alkyl ether where the alkyl group is hydroxyl, amino, dialkylamino or alkoxy substituted or is unsubstituted, and containing 1 to 40 carbon atoms, an alkyl ester, an alkyl amide and a N-alkylamide of a monoethylenically unsaturated mono- or dicarboxylic acid of 3 to 10 carbon atoms where the alkyl substituent contains 1 to 40 carbon atoms, a vinyl ester and an allyl ester of a monocarboxylic acid of 1 to 30 carbon atoms, a N-vinylcarboxamide of carboxylic acids of 1 to 8 carbon atoms, a N-vinyl compound of a nitrogen-containing heterocyclic, said copolymer of (a), (b) and (c) being subsequently reacted with
      (d) an amine of the formula $HNR^1R^2$, wherein $R^1$ and $R^2$ are identical or different and each is hydrogen, an aliphatic or aromatic hydrocarbon radical, a primary or secondary, aromatic or aliphatic aminoalkylene radical, a polyoxyalkylene radical carrying at least one terminal amino group, or a heteroaryl or heterocyclic radical which optionally carries at least one terminal amino group, or, together with the nitrogen atom to which they are bonded, form a ring.

2. The lubricant composition according to claim 1, wherein said amine of the formula $HNR^1R^2$ is ethylenediamine, proplyenediamine, dimethylaminopropylamine, diethylenetriamine, dipropylenetriamine or triethylenetetramine.

3. The lubricant composition according to claim 1, wherein c) in said copolymer is selected from the group consisting of a monoethylenically unsaturated $C_3$–$C_{10}$-monocarboxylic acid, linear 1-olefin of 2 to 40 carbon atoms; an alkyl vinyl ether and an alkyl ally ether where the alkyl radical is of 1 to 40 carbon atoms.

4. The lubricant composition according claim 2, wherein c) in said copolymer is a linear 1-olefin of 2–40 carbon atoms.

5. A process for the preparation of lubricating oil composition, comprising adding to a lubricating oil 1–15% by weight of:
   a copolymer obtained by free radical copolymerization of components consisting essentially of:
   (a) 20–60 mol % of at least one monoethylenically unsaturated $C_4$–$C_6$-dicarboxylic acid or an anhydride thereof,
   (b) 10–70 mol % of at least one copolymerizable oligomer composed of at least 3 olefin molecules of propene or of a branched 1-olefin of 4 to 10 carbon atoms, having an average molecular weight $M_w$ of from 300 to 5000 g/mol, and having a terminal copolymerizable group in the form of a vinyl, vinylidene or alkvl vinylidene group, and
   (c) 1–50 mol % of at least one monoethylenically unsaturated compound which is copolymerizable with the monomers a) and b) and is selected from the group consisting of a linear1-olefin of 2 to 40 carbon atoms, a monoethylenically unsaturated monocarboxylic acid of 3 to 10 carbon atoms, an alkyl vinyl ether and an allyl alkyl ether where the alkyl group is hydroxyl, amino, dialkylamino or alkoxy substituted or is unsubstitutcd and contains 1 to 40 carbon atoms, an alkyl ester, an alkyl amide and a N-alkylamide of a monoethylenically unsaturated mono- or dicarboxylic acid of 3 to 10 carbon atoms where the alkyl substituent contains 1 to 40 carbon atoms, a vinyl ester and an allyl ester of a monocarboxylic acid of 1 to 30 carbon atoms, a N-vinylcarboxamide of a carboxylic acid of 1 to 8 carbon atoms, a N-vinyl compound of a nitrogen-containing heterocyclic, said copolymer of (a), (b) and (c) being subsequently reacted with
   (d) an amine of the formula $HNR^1R^2$, where $R^1$ and $R^2$ are identical or different and each is hydrogen, an aliphatic or aromatic hydrocarbon radical, a primary or secondary, aromatic or aliphatic aminoalkylene radical, a polyaminoalkylene radical, a hydroxyalkylene radical, a polyoxyalkylene radical, a polyoxyalkylene radical carrying at least one terminal amino group, or a heteroaryl or heterocyclic radical which optionally carries at least one terminal amino group, or, together with the nitrogen atom to which they are bonded, form a ring.

6. The lubricating composition according to claim 1, wherein the free radical copolymerization is with a peroxide or azo compound initiator.

7. The process according to claim 5, wherein the free radical copolymerization is with a peroxide or azo compound initiator.

* * * * *